United States Patent

[11] 3,565,221

[72] Inventor Esref I. Halilovic
Dimitrija Tucovica 141, Belgrade, Yugoslavia
[21] Appl. No. 815,890
[22] Filed Apr. 14, 1969
[45] Patented Feb. 23, 1971
[32] Priority Apr. 15, 1968
[33] Yugoslavia
[31] 862/68

[54] REVERSIBLE SWING CLUTCH
3 Claims, 1 Drawing Fig.
[52] U.S. Cl. ................................................... 192/58, 192/105
[51] Int. Cl. ............................................. F16d 37/00
[50] Field of Search .......................................... 192/58, 58 (A7), 58 (A2), 105(A)

[56] References Cited
UNITED STATES PATENTS
1,887,610  11/1932  Widegren et al. ............. 192/58(A2)
2,857,029  10/1958  Ranzi ............................ 192/58(A2)
2,901,074  8/1959   Badin ............................ 192/58(A2)

Primary Examiner—Allan D. Herrmann
Attorney—Wenderoth, Lind and Ponack

ABSTRACT: Reversible swing clutch for transmission of limited turning moment from the driving to the driven side of the clutch, and vice versa which enables unloading of the driving side at the start and gradually loading at the swing of the driven parts and which prevents overloading the driving sides at the static and dynamic turning moments. A cylindrical casing having an internal cylindrical cavity has covers closing the cavity. Fixed bearings for the covers are provided at the centers thereof. A freely rotating shaft is located within the bearings and plate discs are fixed to the shaft having their bottoms mutually pressing in clutch symmetry. The free surfaces of the plate discs are turned towards the side covers. Means prevent axial shifting of the covers. Small-grained material is located between the discs and covers.

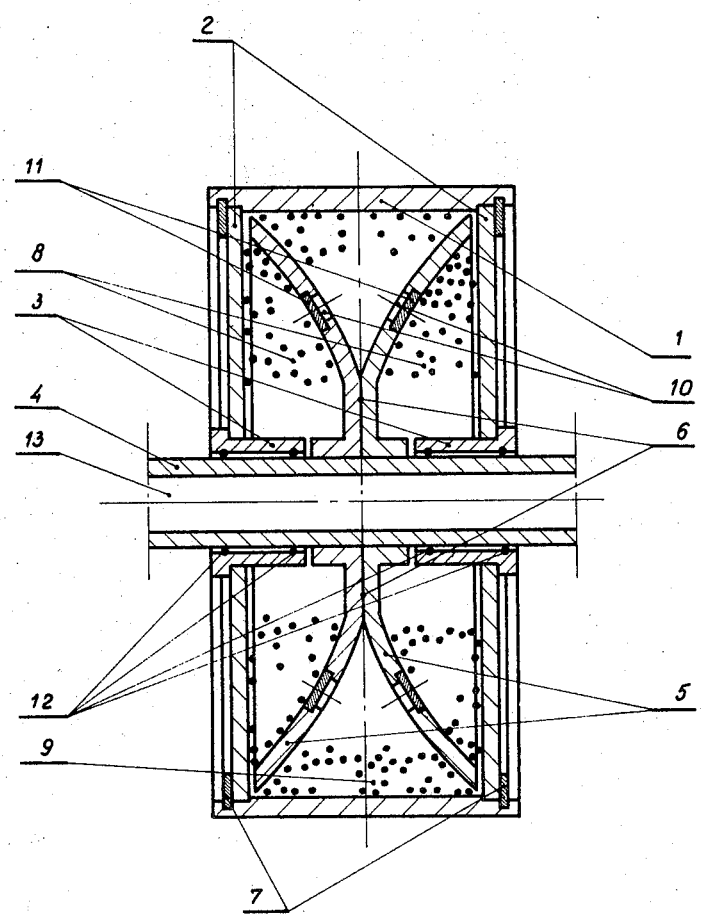
ESREF I. HALILOVIC, Inventor
By. Wenderoth Lind & Ponack,
Attorneys

REVERSIBLE SWING CLUTCH

The subject of this invention is a clutch for gradual overcoming of running and resisting moments of driven parts and transmitting preregulated limited turning moments from the driving system (driving motor) to the driven system.

Pulling moments of many driving sources — especially of small high speed petrol engines, monophase electric motors, three-phase electric motors in the star connection and similar — are relatively small, and it is necessary to undertake a whole line of steps and adding intermediate mechanical and electrical systems to enable the starting of such driving sources in the loaded state. On the other hand, if in such cases there are not included the mentioned intermediate systems for the start and the swing run, the larger and more powerful driving sources must be applied, which then, it is true, enable the start and the swing of driven parts but are at the normal number of revolutions (when the parts are running at the limit of the number of revolutions) usually only partly utilized.

Blocking of the driven side at the start, the swing or at the normal operation, as well as the possible dynamic flows of the driven side, which can be transmitted to the driving side and on it cause damages, often necessitates the undertaking of protective mechanical and electrical steps — application of elastic clutches and materials, breakable elements (cotters), protecting relays on the electric motors and similar means.

Problems of the power reversible transmissions from the driving to the driven side and vice versa — with the preregulated turning moments in both directions — the existing already known solutions of the clutches have not yet solved. Also, the known clutches offer only a partial possiblity, that the problems of the start, the swing of the parts, limit moment of driving sources and driven system, are a successfully solved, while with it such solutions are also relatively complex.

An object of the present invention is to solve the demands of turning moment transmission from the driving to the driven side and vice versa successfully and in a simple way by the clutch of this invention. It enables:
1. start of the driving side (driving source) in the unloaded state;
2. gradual and easy swing of the driven parts — proportional to the increasing of the turning moment of the driven side;
3. reaching of the corresponding preregulated maximal moment over which the driving source cannot be loaded; and
4. replacing of the clutch sides so that the driving clutch side becomes the driven side and vice versa (functional reversibility of the clutch), which is beside others also one of the main distinguishing means of this clutch in relation to the similar swing clutches (centrifugal clutches with shoes and springs, the pellet clutches with the flat disc and similar).

Because of the relatively small scale in relation to the power transmission ability, and because of full radial and axial, symmetry of the parts and the mass, the clutch according to this invention can be successfully applied also in the case of a high number of revolutions which beside the other distinction, offers the possiblity of its wide application.

The FIGURE illustrates a longitudinal cross section of a reversible swing clutch.

In the drawing the cylindrical casing 1 is provided with side covers 2. A shaft 4 extends through the center of the side covers and bearings 3 are located between the shaft and the side covers. The cylindrical casing forms a cavity and in such cavity are located the plate discs 5. The bottoms of the discs 5 abut one another. Rings 7 are provided to maintain the side covers within the casings and a small-grain material 8 is located between the discs and the side covers. A small-grain material 9 is located between the casing the and the discs. Openings 10 are provided in the discs 5 which are closed by the small plates 11. Elastic rings 12 are located between the bearings 3 and the shaft 4. The shaft 4 is also provided with a concentric center hole 13.

In order to grasp more easily the function of the reversible swing clutch it is necessary to differentiate immediately the three groups of parts i.e.:
1. internal kinematic subassembly, composed of the shaft 4 and both plate discs 5 with small plates 11 which compose the kinematical unit;
2. outer kinematic subassembly, composed of the cylindrical casing, both rings 7 and both side covers 2 with bearings 3 and elastic rings 12 which also represent a kinematical unit;
3. material — dynamic agent between internal and external kinematical subassembly, consisting of:
   a. equal quantities of the same small grain material 8 symmetrically situated in the spaces in the plate discs 5 turned towards side covers 2, and
   b. fixed quantities of small grain material 9 situated in the inter space which is limiting the outside surface of the plate discs 5 and internal cylindrical surface of the cylindrical casing 1.

Internal kinematic subassembly represents the kinematic solid unit, which in relation to the external kinematic subassembly, which itself is also a solid kinematic unit can freely rotate.

Free rotation of one of these subassemblies in relation to the other is made possible by spacing the shaft 4 of the internal kinematic subassembly in the bearings 3 of the external kinematic subassembly and by corresponding axial clearances between the plate discs 5 and the bearings 3, from one side, and plate discs 5 and side covers 2 from the other side, as well as by corresponding radial clearances between plate discs 5 and internal cylindrical surface of the cylindrical casing 1.

When in the reversible swing clutch there would be no small grained materials 8 and 9, the internal kinematic subassembly could freely rotate in relation to the external kinematic subassembly, practically without mutual withdrawal of these subassemblies, as the resistances in the bearings 3 and on the elastic rings 12 are minimal.

The function of the reversible swing clutch will be noticed if the three basic possibilities of its function are observed i.e.:
I. the transmission of the turning moment from the internal kinematic subassembly to the external kinematic subassembly;
II. the transmission of the turning moment from the external kinematic subassembly to the internal kinematic subassemlby; and
III. simultaneously combined action of both clutch kinematic subassemblies.

For the transmission of the turning moment according to the variant I the aid of small grained material 8 is indispensable for filling up interspaces between side covers 2 and plate discs 5. For this it is necessary to pour into one and into the other plate disc 5 equal quantity of the same small-grained material 8, thereby ensuring the neutralizing action of the axial forces in the clutch itself.

By dosing of the smaller or the greater quantity of the small grained material 8, the transmission of the smaller or of the greater turning moment is made possible from the internal to the external kinematic subassembly.

It is preferred that the particles of the small-grained material 8 have round-shaped outside surfaces and a ball-resembling form, so that the particle dimensions are resembling, and that the smallest particles of the small-grained material 8 still have considerable larger dimension, for example 10 times larger than the largest axial clearance between plate discs 5 and the side covers 2, but also to be considerably smaller, for instance 10 times larger than the largest axial clearance between plate discs 5 and the side covers 2, but also to be considerably smaller, for instance 10 times than the largest depth of the disc plates 5. Such shapes and particle dimensions of the small-grained material 8 — in relation to the maximal dimensions of the axial clearances between plate discs 5 and side covers 2, as well as in relation to the maximal depth of plate discs 5 — enable the filling of this small-grained material 8 into plate discs 5, similar to that of viscous liquids with the assurance that it does not stick nor force out the particles of the small-grained material 8 through the axial clearance between plate discs 5 and side covers 2.

The transmission of the turning moment by the aid of the small-grained material 8 from the internal to the external kinematic subassembly begins by rotating and the swing of the parts of the internal kinematic subassembly which in this transmission variant (I) plays the role of the clutch driving part. Here, the role of the small-grained material 9 is of secondary importance, while the swing of the external kinematic subassembly — as the driven part of the clutch — can be performed even without the small-grained material 9.

When, under the described conditions the internal kinematic subassembly begins rotating, the small-grained material 8, which is in the plate discs 5, begins to be flung evenly under the action of the centrifugal force to he the periphery of the discs, and the small-grained material 8 is directed on to the side covers 2. As the number of revolutions of the plate discs increases, this likewise increases the pressure and the friction of the small-grained material 8 on the side covers 2. At the beginning, while the active, friction moment of the small-grained material 8 on the side covers 2 is smaller than static turning moment of the external kinematic subassembly the small-grained material 8 slides along the side covers 2. With the further increase of the revolving speed of the plate discs 5, the friction of the small-grained material 8 against the side covers 2 also increases, and at a certain moment starts overcoming the static turning moment of the external kinematic subassembly. Then, the friction moment of the small-grained material 8 starts pulling the driven external kinematic subassembly, gradually giving it increasingly the greater revolving speed. Simultaneously, with the acceleration (swing) of the external kinematic subassembly for still some short time lasts also the acceleration of the plate discs 5, which produces greater friction (still greater pulling moment) of the small-grained material 8 against the surfaces of the side covers 2. From the moment of starting the motion of the external kinematic subassembly, until the achievement of the synchronized number of revolutions (nominal number of revolutions) with the internal kinematic subassembly small-grained material 8 slides through along the side covers 2. This sliding through as well as sliding of the small-grained material 8 until the start-moving of the external kinematic subassembly, causes heating of the side covers 2 but that appearance does not act negatively on the reversible swing clutch operation, considering that the surfaces of the side covers 2 are relatively large and that while rotating are intensively cooled by the surrounding air.

At the normal number of revolutions of the clutch, rotating speeds of the internal and the external kinematic subassembly, as well as of the small-grained material 8 are synchronal, so that there is no mutual sliding through of the reversible swing clutch parts in that case. However, in the case that on the driven side of the clutch — in the variant I of transmission, on the external kinematic subassembly — comes to overloading i.e. the rapid increase of the rotating moment above the nominal, this overloading will not be transferred to the driving side on the internal kinematic subassembly, considering that in this case the pulling ability of the clutch from the external to the internal kinematic subassembly is equal to zero (when in the reversible swing clutch there is no small-grained material 9, as it was previously supposed for the variant I of pulling (drive) from the internal to the external kinematic subassembly).

Transmission possibility of the rotating moment from the external kinematic subassembly to the internal kinematic subassembly — according to variant II of transmission — is realized by the aid of small-grained material 9 situated in the interspaces, limited by the external surfaces of the plate discs 5 and the internal cylindrical surface of the cylindrical 1. According to this, the II variant of transmission, the role of the driving side has the external kinematic subassembly, while the role of the driven side of the clutch has the internal kinematic subassembly, i.e. the clutch sides have in the relation to the variant I of transmission completely changed the roles (reversibility of the reversible swing clutch).

THe form and granulometry of the small-grained material 9 should be similar to the small-grained material 8, which (small-grained material 8) is not indispensable for the variant II of transmission and will be in further explanation of the clutch functions according to this variant (II) presumed, that there is no small-grained material 8. It is preferable that the particles of the small-grained material 9 still have the considerable larger dimension, for example 10 times larger than the largest radial clearance between plate discs 5 and the internal cylindrical surface of the cylindrical casing 1, but to be considerably smaller, for example 10 times, than the intermediate axial distance between the external surfaces of the plate discs 5, between which is situated the small-grained material 9.

Such dimensional relation of the small-grained material 9 and the space in which it is situated, enables behavior of the small-grained material 9, under the action of the centrifugal forces which originate from its rotation, similar to viscous liquids, with the assurance that it does not t stick nor force out the small-grained material 9 through the radial clearances between plate discs 5 and the internal cylindrical surfaces of the cylindrical casing 1.

Transmission of the turning moment by the aid of small-grained material 9, from the external to the internal kinematic assembly, begins by the turning and the swing of the external kinematic assembly parts. At this state, the small-grained material 9, under the action of the centrifugal force, is being evenly flung on to the internal cylindrical surface of the cylindrical casing 1, which tends axially that small-grained material 9 also be pushed out sideways, which is prevented by the external surfaces of the plate discs 5. The pressure of the small-grained material 9 against the external surfaces of the plate discs 5 increases with the increase of the number of revolutions of the external kinematic assembly. At the beginning, while the active friction moment of the small-grained material 9 against the external surfaces of the disc plates 5, is smaller than static turning moment of the internal kinematic assembly — the small-grained material 9 is sliding on the external surfaces of the plate discs 5. By revolving speed increase of the external kinematic assembly, the friction of the small-grained material 9 against the external surfaces of the plate discs 5 also increases, and at a certain moment begins to overpower the static turning moment of the internal kinematic assembly. Then, the small-grained material 9 starts pulling the driven internal kinematic assembly, gradually giving to it the more higher turning speed. Simultaneously with the acceleration (swing) of the internal kinematic assembly, which for a certain short time lasts the acceleration of the external kinematic assembly increases also, which exerts still greater friction (still greater pulling moment) of the small-grained material 9 on the external surfaces of the plate discs 5. From the moment of starting the motion of the internal kinematic assembly till the achievement of synchronized number of revolutions (nominal number or of revolutions) with the external kinematic assembly, the small-grained material 9 is sliding through on the external surfaces of the plate discs 5. This sliding through, as well as sliding of the small-grained material 9 until starting the motion of the internal kinematic assembly, causes the heating of the plate discs 5 but that appearance does not effect negatively the operation of the reversible swing clutch, considering that the surfaces of the plate discs 5, which are in contact with the small-grained material 9, are relatively large and that during the revolving are intensively cooled by the surrounding air (over the cylindrical casing 1 and the small-grained material 9).

At the nominal number of revolutions of the clutch, the revolving speed of the external and internal kinematic assembly are synchronized and with these the rotating speed of the small-grained material 9 is also synchronized, so that no mutual sliding through of the reversible swing clutch parts takes place at that time. However, in case that on the driven side of the clutch — in the variant II of transmission, on the internal kinematic assembly — comes to overloading, i.e. to the sudden increase of the turning moment above the nominal, this overloading will not be transmitted to the driven side, on the external kinematic assembly, considering that in this case the clutch pulling ability from the internal to the external kinematic assembly is equal to zero.

The variant III of transmission of the reversible swing clutch, when there are simultaneously being utilized fixed quantities of the small-grained materials 8 and 9, offer the possibility of transmitting the fixed amounts of turning moments from the internal to the external kinematic assembly, and from the external to the internal kinematic assembly. It is clear that each of these two turning moments as desired (by regulating the quantities of the small-grained materials 8 and 9), in the simple way, can be regulated from zero to its maximal value. By the described way, in case of agreement of both frictional moments, can be formed the growth curve of the turning moment during the swing (the curve, the time-turning moment) in the way that best corresponds to the driving side of the clutch.

With the aim that some constructional elements of the reversible swing clutch in the best way be adapted to the power transmission system, the cylindrical casing 1 can be produced in the variant as the belt-pulley (for the V or flat belt) then in the form of chain, toothed and similar; the external kinematic assembly can be connected to the driving or to the driven side of the clutch, through side covers 2, while bearings 3 can be produced in the usual way as frictionless rolling etc.

The listed functional and constructional qualities of the reversible swing clutch solve a range of problems in the systems for transmitting rotation thereby offering wide possibilities of its technical utilization.

I claim:

1. Reversible swing clutch for transmission of limited turning moment from the driving to the driven side of the clutch, and vice versa which enables unloading of the driving side at the start and gradually loading at the swing of the driven parts and which prevents overloading the driving sides at the static and dynamic turning moments comprising a cylindrical casing 1 having an internal cylindrical cavity, covers 2 closing said cavity, fixed bearings 3 for said covers at the center thereof, a freely rotating shaft 4 within said bearings, plate discs 5 fixed to said shaft having their bottoms 6 of the plate discs mutually pressing in clutch symmetry, the free surfaces of said plate discs 5 being turned towards said side covers 2, small-grained material in said cavity and between said discs and side covers and means for preventing axial shifting of said covers.

2. Reversible swing clutch as set forth in claim 1 wherein interspaces are provided between said side covers 2 and said plate discs and said small grained material 8 has its smallest grains larger than said interspaces and clearances are provided between said discs and the internal cylindrical surface of said cylindrical casing 1 and said small-grained material 9 has its smallest grains larger than said clearances.

3. Reversible swing clutch as set forth in claim 1 wherein said discs 5 have axially and radially symmetrically spaced openings 10, small plates 11 closing said openings, and elastic rings 12 closing the internal operating space of said bearings 3.